Nov. 15, 1966  R. W. KOSS  3,286,248

RECORDING LEVEL INTENSITY INDICATOR

Filed Oct. 25, 1962

INVENTOR
RONALD W. KOSS
By
Carpenter Abbott Coulter & Kinney
ATTORNEYS

United States Patent Office 3,286,248
Patented Nov. 15, 1966

3,286,248
RECORDING LEVEL INTENSITY INDICATOR
Ronald W. Koss, Chicago, Ill., assignor to Minnesota Mining and Manufacturing Company, St. Paul, Minn., a corporation of Delaware
Filed Oct. 25, 1962, Ser. No. 233,022
5 Claims. (Cl. 340—253)

This invention relates to a visual recording level indicator and is especially concerned with the problem of obtaining better control of recording level in magnetic recording devices of the type used in the home.

In audio recording, the amplifier output voltage varies greatly between pianissimo and fortissimo passages or when a speaker turns his head or moves toward and away from the microphone. For good quality reproduction, the operator must continually adjust the recording level to maintain a reasonably constant level. This level must be reproducible so that recordings made on different occasions may be reproduced successively without the listener being required to adjust the playback volume. Ideally, this constant recording level is as close to the level of saturation of the recording media as possible, i.e., as far above noise level as possible.

Various recording level indicators are presently known. Most home recorders employ neon indicators, but these are peak indicating devices which emit a flash with any instantaneous voltage above a predetermined level. It is usual to equip a recorder with a pair of neon indicators, one adjusted to emit flashes at recording levels below the saturation level of the recording media and one adjusted to emit flashes at levels above saturation to indicate distortion. However, it is difficult to interpret these flashes since they indicate peak rather than root-mean-square voltages. For example in recording a largo, the peak voltages are little higher than the average signal voltage and the tendency is to adjust the recording level just below the saturation level of the recording medium; whereas for staccato music or excited speech, there is a tendency to adjust the recording level much lower. In other words, the occurrence of a given number of flashes on a neon indicator within a given period of time does not necessarily indicate that the average recording level is constant. Thus, great skill, with due regard to the character of the sound being recorded, is necessary to achieve proper recording level.

Where cost of equipment is less important, as in professional recording devices, VU meters are standard in the industry. These are calibrated to indicate R.M.S. voltage and are damped to provide relatively easy direct reading from a scale of numbers. However, VU meters are too costly for use in home recording units.

The recording industry has long felt great need for a recording level indicator which is as economical as a neon indicator but which gives a R.M.S. voltage indication and is as easy to interpret as a VU meter and has a damping characteristic similar to that of a VU meter. This need for an economical substitute for the neon indicator has become particularly acute in the past several years with widespread use of transistors since transistorized audio amplifiers have such low output voltage whereas neon indicators operate at relatively high voltages.

The present invention provides a recording level indicator which indicates R.M.S. signal voltage and is especially adapted for use with transistorized amplifiers—requiring no special power supply.

Briefly, the novel recording level indicator of the present invention comprises a circuit connected to the amplifier output which includes an incandescent lamp and means providing a predetermined resistance in said circuit affording a dull red glow to said lamp when the amplifier output is at a desired recording level and affording a bright glow when the output is approaching the distortion level. In a preferred embodiment this audio volume indicator employs two incandescent lamps, a first of which is connected to the amplifier output in a first circuit and the second of which is connected to the amplifier output in a second circuit. The first circuit presents a predetermined relatively low resistance path allowing said first lamp to produce a bright glow when the output signal of the amplifier reaches a predetermined desired recording level. A resistor in series circuit relation with said second lamp in the second circuit provides a relatively high resistance path allowing said second lamp to produce only a perceptible glow at said predetermined desired recording level and a bright glow as the recording level approaches distortion.

The present invention will be more readily understood after a perusal of the following description, especially when considered in connection with the accompanying drawings illustrating the invention, wherein.

Figure 1:
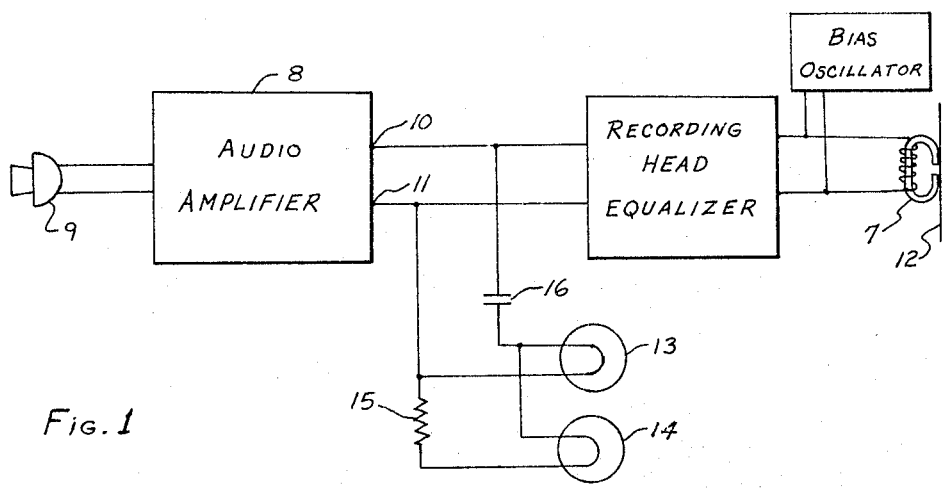
FIGURE 1 is a diagram of a magnetic recording circuit including a preferred recording level indicator of the invention.

The typical recording circuit illustrated in FIGURE 1 of the drawing includes a recording head 7 to which is applied signals from a transistorized audio amplifier 8 which is driven by a suitable signal generator or input device such as a microphone 9. If signals sent to the recording head 7 are too weak, the resultant playback will be masked in noise. If the signals are too strong, a saturation level of the recording media 12 will be exceeded and there will be distortion on playback. It is therefore desirable that the recorder have an indicating device such that the operator can readily determine whether the signal imparted to the recording head 7 is impressing an electromagnetic signal on the recording media which, when played back, will produce a satisfactory reproduction of the signal recorded.

The present invention provides an improved device for indicating the recording level including a first incandescent lamp 13 in a first low resistance circuit and a second incandescent lamp 14 in a relatively high resistance second circuit. As indicated in FIGURE 1, the lamps are connected in parallel circuit relation with respect to the output of the audio amplifier 8. A resistor 15 is connected in series relation with the incandescent lamp 14 in the second circuit providing a fixed resistance therein, or less desirably, it would be apparent to one skilled in the art that the lamps 13 and 14 could be connected in series with the lamp 14 shunted by a resistor. A capacitor 16 connected in series circuit relation with the first and second circuits serves to block D.C. voltage present across the amplifier output terminals 10 and 11.

Figure 3:
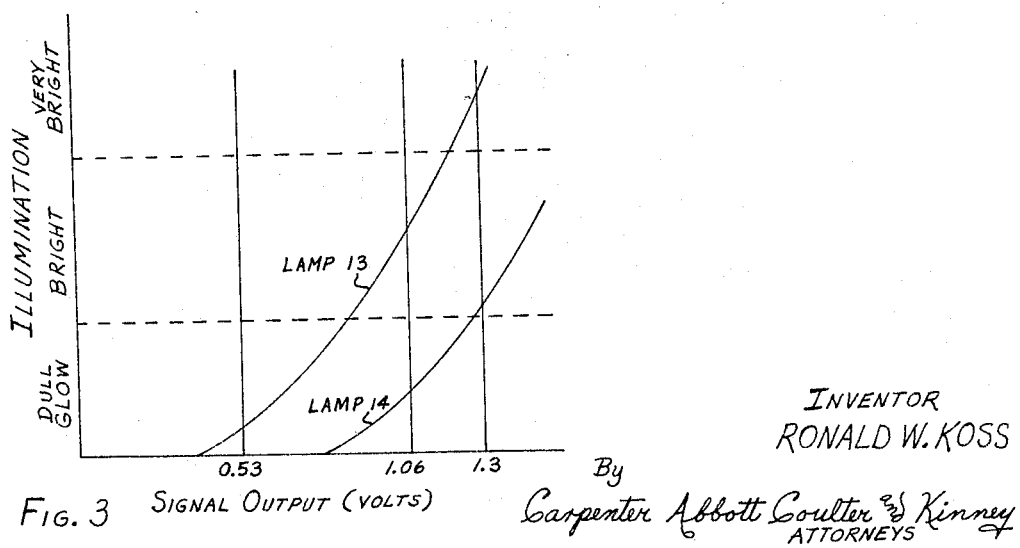
FIGURE 3 is a graphical representation of illumination vs. voltage of an incandescent lamp employed to indicate recording level in the practice of this invention.

In a particular magnetic recorder, the saturation level of the recording medium may be reached at an amplifier output of 1.3 volts, in which case it may be desired to establish a normal recording level of 1.06 volts. Using a transistorized audio amplifier having an output voltage of between 0 and 2 volts, the lamps 13 and 14 may be 2-volt, 60-milliampere, No. 49 panel lamps and the resistor 15 may have a rating of 15 ohms. When the voltage across the amplifier output terminals 10 and 11 is 0.53 volt, the lamp 13 has only a perceptible dull red glow and the lamp 14 is dark, as shown in FIGURE 3. When the amplifier output voltage is 1.06 volts, the lamp 13 produces a bright glow and lamp 14 has a dull red glow. Upon approaching distortion at 1.30 volts, the lamp 13 glows very brightly and lamp 14 is changing from a dull to a bright glow. Contrasting these definite indications of signal output to the haphazard flashing of neon indicators, it will be appreciated that the present invention makes it easy for the operator of the magnetic recorder to maintain the recording level fairly constant and in all events above 0.53 volt (which is still well above noise levels) without danger of exceeding the 1.3-volt distortion level. Furthermore, because the incandescent lamp indicates R.M.S. voltage and is inherently damped by virtue of the thermal time constant of the filament, the visual indication afforded by the indicator lamps of FIGURE 1 essentially approximates that of a standard VU meter. Such damping allows peaks or surges of output into the saturation range to pass without effect on the indicating device so that the operator does not change the recording level. If such peaks gave a visual indication as they do on neon indicators, the operator would be inclined to reduce the recording level even though they have no appreciable effect on the basic quality of the recording.

Figure 2:
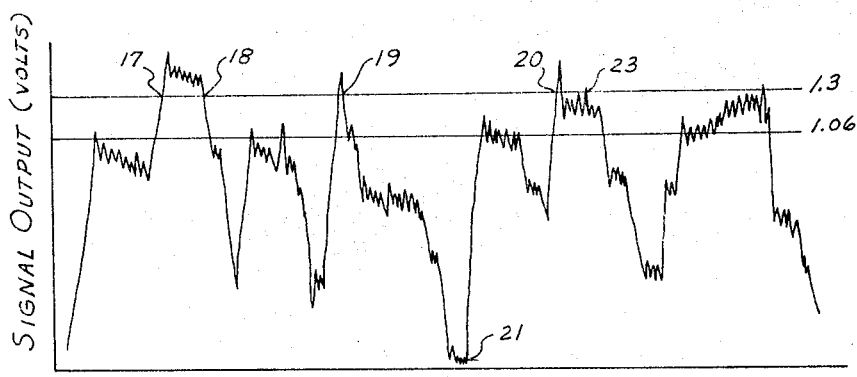
FIGURE 2 is a graph of audio output vs. time for a typical voice pattern.

Referring to FIGURE 2 which is a plot of signal voltage versus time for typical speech, horizontal lines represent the desired recording level, for example 1.06 volts, and the level of distortion or recording media saturation, for example 1.3 volts. Between point 17 and point 18 on the graph, the output shown is in the range of saturation and the resultant playback would be distorted. This is indicated to the operator during recording by the fact that both lamp 13 and lamp 14 are glowing brightly. A slight adjustment in volume brings the sound into the desired normal recording level, after which the signal voltage is maintained so that lamp 13 has a bright glow and the lamp 14 a dull red glow, indicating normal recording level. Peaks at points 19 and 20 are too brief to make the lamps increase perceptibly in intensity due to the thermal time constant of the lamp filaments, but this has no real effect on the quality of the recording on playback. At point 21 the voice may pause and the recording level drops to the noise region at which point both lamps temporarily go out. In the area of point 23 the lamp 13 is very bright and lamp 14 tends to change from a dull to a bright glow as will be seen by reference to FIGURE 3. This indicates the approach of tape saturation, and the operator may begin to adjust the recording level slightly downward.

The No. 49 panel lamps employed in the foregoing illustrative embodiment have tungsten filaments which are preferred since they are inexpensive, efficient and long lasting. Furthermore, the resistance of a tungsten filament increases with increased heat so that a broader indication of voltage level is obtained. Carbon filaments have an inverse resistance-temperature relationship and so provide much more sensitive indication of voltage level and may be useful in an auxiliary lamp for fine adjustment of recording level.

What is claimed is:

1. In apparatus for recording output signals from a transistorized audio amplifier on recording media including a device for indicating the volume level, said device comprising a circuit including an incandescent lamp and means providing a predetermined resistance in said circuit, said lamp and said predetermined resistance means being connected across said amplifier output to have the output signals impressed directly thereon causing said output signals to directly energize said lamp, said predetermined resistance means causing said lamp to have a dull red glow when the amplifier output signals are at a desired recording level and affording a visible change in illumination in said lamp from said dull red glow to a bright glow when the R.M.S. of the output signals approach the distortion level.

2. In a recording device, the combination of a transistorized audio amplifier having output terminals and an output signal recording level indicating device, said indicating device comprising a first filament lamp connected across the output of said amplifier in a first circuit to have the output signals impressed directly thereon causing said output signals to energize said first lamp and a second filament lamp connected across the output of said amplifier in a second circuit to have the output signals impressed directly thereon causing said output signals to energize said second lamp, said first circuit presenting a relatively low resistance path allowing said first lamp to produce a bright glow when the output signals of the amplifier reach a predetermined desired recording level and said second circuit presenting a relatively high resistance path allowing said second lamp to produce only a perceptible glow at said predetermined desired recording level and a visible change in illumination from said perceptible glow to a bright glow as the R.M.S. of the recording level approaches distortion.

3. In a recording device, the combination of a transistorized audio amplifier having output terminals and an output signal recording level indicating device, said indicating device comprising a first filament lamp connected across the output of said amplifier in a first circuit to have the output signals impressed directly thereon causing said output signals to energize said first lamp and a second filament lamp connected across the output of said amplifier in a second circuit in parallel with said first circuit to have the output signals impressed directly thereon causing said output signals to energize said second lamp, said first circuit presenting a predetermined relatively low resistance path allowing said first lamp to produce a bright glow when the output signal of said amplifier reaches a predetermined desired recording level, and a resistor in series circuit relation with said second lamp in said second circuit to provide a relatively high resistance path allowing said second lamp to produce only a perceptible glow at said predetermined desired recording level and a visible change in illumination from said perceptible glow to a bright glow as the R.M.S. of the recording level approaches distortion.

4. In a recording device, the combination of a transistorized audio amplifier having output terminals and an output signal recording level indicating device, said indicating device comprising a first filament lamp connected to the output terminals of said amplifier in a first circuit and a second filament lamp connected to the output terminals of said amplifier in a second circuit in parallel with said first circuit, said circuits being responsive directly to said output signals, said first circuit presenting a predetermined relatively low resistance path allowing said first lamp to produce a bright glow when the output signal of said amplifier reaches a predetermined desired recording level, a resistor in series circuit relation with said second lamp in said second circuit to provide a relatively high resistance path allowing said second lamp to produce only a perceptible glow at said predetermined desired recording level and a visible change in illumination from said perceptible glow to a bright glow as the R.M.S. of the recording level approaches distortion, and a capacitor in said lamp circuits for blocking direct current voltage across said lamps.

5. In apparatus for recording output signals from a transistorized audio amplifier on recording media including a device for indicating the volume level, said device comprising an incandescent lamp and a resistor connected in series circuit relation and connected across the output of said amplifiers to have the output signals impressed directly thereon causing said output signals to energize said lamp, said resistor having a predetermined value affording a dull red glow to said lamp when the amplifier output is at a desired recording level and affording a visible change in illumination from said dull red glow to a bright glow when the R.M.S. of the output signals approach the distortion level, and a capacitor in said lamp circuit for blocking direct current voltage across said lamp.

(References on following page)

References Cited by the Examiner

UNITED STATES PATENTS

| | | | |
|---|---|---|---|
| 1,291,197 | 1/1919 | Shoenberg et al. | 324—133 X |
| 1,455,458 | 5/1923 | Townsend. | |
| 1,690,279 | 11/1928 | Craft | 340—332 X |
| 2,050,852 | 8/1936 | Moore | 340—253 |
| 2,125,468 | 8/1938 | Sinninger | 325—455 X |
| 2,159,240 | 5/1939 | Wheeler | 340—253 |
| 2,411,848 | 12/1946 | Camras | 340—253 X |
| 2,450,450 | 10/1948 | Schmidinger. | |
| 3,099,827 | 7/1963 | Wu | 340—248 |

FOREIGN PATENTS 163,375  11/1948  Austria.

OTHER REFERENCES

"Elements of Magnetic Tape Recording," by Haynes; copyright 1957, Prentice-Hall, Inc., page 344.

"Elements of Tape Recorder Circuits," by Burstein and Pollak; copyright 1957, by Gernsback Library, Inc., pp. 187–189.

"Tape Recorders, How They Work," by Wescott and Dubbe, March 1962, by Howard W. Sams & Co., Inc., p. 76.

NEIL C. READ, *Primary Examiner.*

D. K. MYER, *Assistant Examiner.*